United States Patent [19]

Grobl

[11] Patent Number: 4,663,880
[45] Date of Patent: May 12, 1987

[54] LIGHT EMITTING FISHING LURE

[76] Inventor: George Grobl, 1578 Graff Ave., San Leandro, Calif. 94577

[21] Appl. No.: 824,860

[22] Filed: Jan. 31, 1986

[51] Int. Cl.$^4$ ............................................. A01K 85/01
[52] U.S. Cl. ..................................................... 43/17.6
[58] Field of Search ................................ 43/17.6, 17.5

[56] References Cited

U.S. PATENT DOCUMENTS 2,121,114  6/1938  Beck ...................................... 43/17.6
4,227,331 10/1980  Ursrey .................................... 43/17.6

FOREIGN PATENT DOCUMENTS 57754  3/1937  Norway ................................. 43/17.5
459939  4/1935  United Kingdom ................. 43/17.6

Primary Examiner—Gene P. Crosby
Attorney, Agent, or Firm—Bruce & McCoy

[57] ABSTRACT

A light emitting fishing lure of the plug type provided with an external switch, the light emitting source formed to simulate semi-globular protruding eyes for maximum illumination.

1 Claim, 3 Drawing Figures

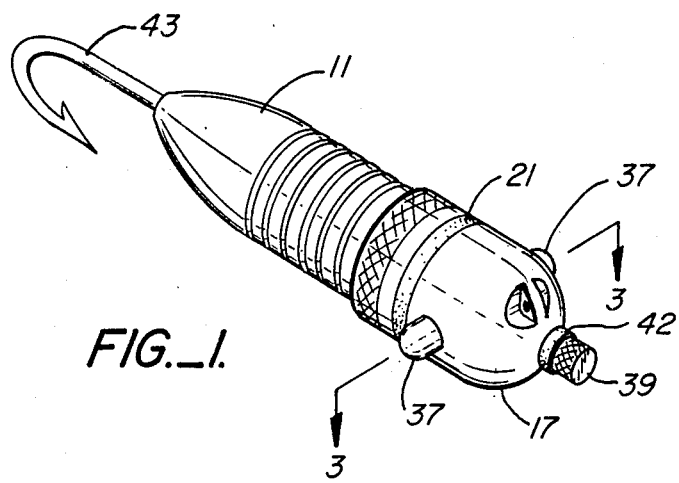
FIG._1.
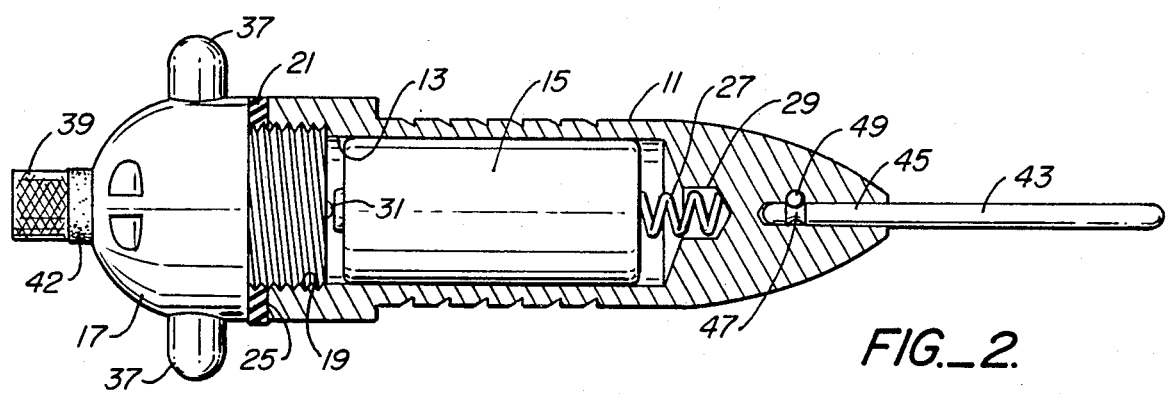
FIG._2.
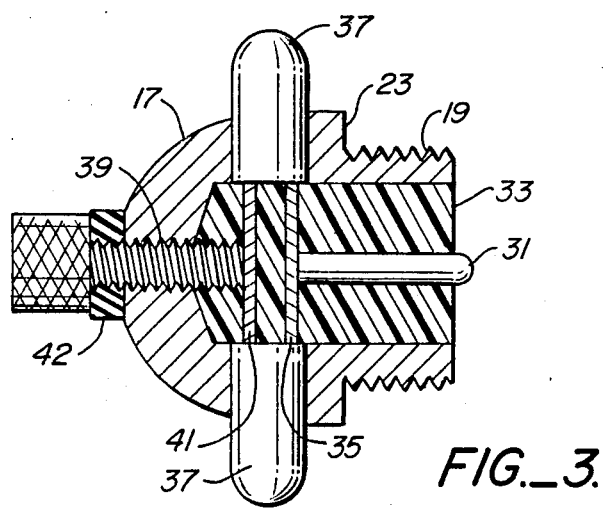
FIG._3.

LIGHT EMITTING FISHING LURE

BACKGROUND OF THE INVENTION

1. Field of the Invention

The present invention relates to fishing lures. More particularly, it relates to self-contained light emitting fishing lures for enhanced fish attracting qualities.

2. Description of the Prior Art

Six prior art patents have been located which disclose light emitting fishing lures. The first is U.S. Pat. No. 4,227,331 issued Oct. 14, 1980 to Ursrey, et al. for a Fish Lure. That patent describes a lure which uses one or more light emitting diodes, preferably of a type which emits green light, and includes a suitable power source disposed internally of the lure body for energizing the diode. The light emitting diodes are attached to and protrude outwardly from the lure body so as to provide wide angle disbursion of light. When the lure is submerged in water, an electrical circuit is established to activate the light emitting source.

Another is U.S. Pat. No. 4,250,650, issued Feb. 17, 1981, to Raoul G. Fima for an Intermittently Illuminated Fishing Lure. That patent discloses a fishing lure containing one or more light sources and which includes an internal guide way along which a battery rolls back and forth in response to an occillatory movement of the lure. A series of stationary electrical contacts are positioned along the guide way to successively engage the moving battery to intermittently complete a circuit and energize the light sources. The light sources are mounted internally for protection of the lure body and the light is transmitted to exterior locations by optical conductors.

A further one is U.S. Pat. No. 3,621,600 issued Nov. 23, 1971 to M. Dworski for a Fish Lure, and it discloses a lure which has a separate translucent head and body members which are assembled to the head either in the form of a series of disks or like halves assembled around an incandescent lamp and dry cell which weight the lure.

Yet another is U.S. Pat. No. 3,608,228 issued Sept. 28, 1971, to R. W. Borreson, et al. for a Fishing Lure. That patent discloses a lure of the plug type comprised of hollow detachable sections which are provided with apparatus for illuminating the lure. Various weights may be positioned within the lure cavities, and the head section is formed of translucent material to provide a prismatic effect for the illumination means to form eye simulating areas on each side of the head section of the lure.

Still further is U.S. Pat. No. 3,040,462 issued June 26, 1962, to F. C. Guida for a Luminescent Fishing Lure. That patent discloses a lure which has a pair of chambers, one of which contains a power source and the other of which contains a light emitting bulb which also projects into a third water filled chamber and illuminates the lure by transmitting light through the translucent body of the lure.

Still another is disclosed in U.S. Pat. No. 2,121,114 issued June 21, 1938, to G. Beck for a Fish Lure. That device discloses a fish lure also having a translucent body within which a light emitting source is disposed for illuminating the lure.

The present invention provides a simplified device which makes use of improved electronics for longer life and ease of construction to reduce cost as compared with the referenced prior art devices. A significant difference between the present invention and the known prior art is that in most cases the prior art devices must be disassembled to remove the battery in order to shut off the light emitter. They do not include a positive switch means for actuating the light sources from a position external to the lure or without immersing the lure in water.

Because of the very hostile environment the lures are subjected to, it is very desirable to be able to check batteries and interal circuitry of an illuminable lure quickly. Fishermen also like to be able to change lures rapidly, and in order to accomplish this with the least loss of time, an external switch means is required to turn off the replaced lure and turn on the new one. Disassembly and assembly of lures, with their differing battery requirements, sizes, and parts shut off and turn on a lure makes those procedures unsatisfactory in the most desired fishing environment.

SUMMARY OF THE INVENTION

The present invention is a light emitting fishing lure which includes a body portion having a cavity formed therein for containing one or more batteries. An electrical contact for establishing an electrical connection with the battery is formeed integral to the cavity. The cavity includes means for urging the battery toward the front end or head portion of the lure. At least one fish hook is secured to the body portion of the lure. A head portion is provided which is securable to the body portion. The front end of the body portion is adapted to mate with the head portion in sealing relation to prevent water from entering the cavity portion of the body. An electrical contact for the battery of opposite polarity from the body portion contact is provided in the head to complete the electrical circuit for the lure. A switch means operable from a position external to the head and body portions is formed integral to the lure for activating the battery. At least one light emitting diode projects from the lure and is electrically connected to the battery and the switch means.

OBJECTS OF THE INVENTION

It is therefore an important object of the present invention to provide a simplified illuminated lure.

It is another object of the present invention to provide an illuminated lure using light emitting diodes as simulated eyes or other features for the lure which flash on and off for increased fish attraction.

And it is a further object of the present invention to provide an illuminated fishing lure which has an external switch to allow the light emitter to be turned on and off without assembly or disassembly of the lure and while it is held in the fisherman's hands.

Other objects of the invention with become apparent when it is considered in conjunction with the accompanying drawings.

DESCRIPTION OF THE DRAWINGS

FIG. 1 is a perspective view of the light emitting fishing lure of the present invention;

FIG. 2 is a side elevation view thereof; and

FIG. 3 is a cross-section taken along lines 3—3 of FIG. 1.

DESCRIPTION OF THE PREFERRED EMBODIMENT

FIGS. 1 and 2 disclose the light emitting fishing lure of the present invention. It includes a body portion 11 which has a cavity 13 formed therein for containing one or more batteries 15, and a head portion 17 which is securable to the body portion. The front end of the body portion of the lure is adapted to mate with the head portion 17 in sealing relation to prevent water from entering the cavity portion of the body 11. The head portion 17 of the lure is securable to the body portion by means of a threaded connection 19 which is made water tight by means of a gasket 21 in the form of a washer or "O" ring disposed around the threaded shank of the head portion and squeezed between the peripheral shoulders of the head and body portions 23, 25 respectively.

The body portion 11 has an electrical contact integral thereto for making an electrical connection with the battery 15. In its simplest form that connection is comprised of a spring 27 which also is the means for urging the battery toward the head portion of the lure. The body portion 11 of the lure can be made of metal for conducting electrical current or of plastic with the electrical circuit molded into it. The contact between the lure body and the battery is made by the spring 27 which effects an electrical connection between the two. The spring contacts the negative electrode or bottom of the battery, and the spring is in electrical contact with the body portion of the lure by virtue of its fit in the small cavity 29 disposed at the rear end of the lure. This cavity is a female recess formed to hold the spring 27 therein with a friction fit so that when the battery is removed from the cavity, the spring remains in its predisposed position in the body of the lure at the rear end thereof.

The head portion 17 of the lure shown in FIG. 3 has an electrical contact 31 for engaging the battery which is of opposite polarity from the body portion contact. In the preferred embodiment, this contact which engages the positive electrical contact of the battery is a projecting stud 31 which is imbedded in an epoxy matrix 33 which fills the cavity in the head portion 17 of the lure and insulates the post 31 from the head portion if it is metal. The fixed post is in electrical contact with the positive leads 35 for the light emitting diodes (LEDs) 37 by being soldered thereto. The head portion may also be all plastic with the diodes, circuit wires, and electrical contacts all molded integrally therein. When the head portion of the lure is screwed into the body portion, the projecting post 31 engages the positive contact of the battery and remains in continuous engagement therewith by virtue of the spring 27 pressure.

A switch means is provided integral to said lure for activating the battery from a position external to the lure. This is effected by an electrical contact which is a reciprocatable stud 39 that projects through the metal head portion of the lure to contact the negative lead 41 of the circuit of the light emitting diode(s). The respective ends of the negative 41 and positive leads 35 of the LEDs are soldered together before they are potted in the epoxy matrix of the head. In order to complete the electrical circuit and activate the diodes 37, the preferred embodiment of the invention utilizes a threaded knurled stud 39, which is electrically connected to the front end of the head portion of the lure through the threaded engagement therewith. The stud is screwed inward until it contacts the negative lead 41 of the light emitting diodes 37 establishing the electrical circuit. A gasket or "O" ring is used to seal the stud. The negative and positive leads are insulated from each other by the epoxy matrix 33. Thus, the knurled stud 39, which can be screwed in and out of the head portion 17 of the lure from outside of the lure, is the switch means for turning on and off the flashing light emitting diodes 37 by completing the electrical circuit. Other mechanical means for reciprocating the stud can be utilized other than the threaded engagement.

While the invention contemplates at least one light emitting diode 37 projecting from the lure and being electrically connected to the battery by the switch means, the preferred embodiment utilizes a pair of light emitting diodes which are disposed on, and epoxied into, opposite sides of the lure to project from the head portion thereof with semi-globular configurations for maximum light dispersion simulating a pair of eyes. Additional LEDs could be employed to simulate other features of a fish or simply be disposed at preferred locations to provide additional light emission sources. In the preferred embodiment the LEDs 37 are provided with a solid state circuit which interrupts the electrical flow to make the LEDs intermittent in their light emission. The preferred embodiment of the invention includes at least one fish hook 43 secured to the body 11 of the lure. The end of the shank 45 of the hook is provided with a groove 47 instead of an eye. A pin 49 which is force fitted through the body of the lure engages the groove of the fish hook and allows the hook to rotate in its connection to the lure body. The hook can be camouflaged by a rubber or plastic hula skirt disposed over the rear of the lure body and multiple and ganged hooks can be employed as with other lures.

Thus, it will be seen from the description of the preferred embodiment of the present invention that all of the objects and advantages attributable thereto have been attained. While the invention has been described in considerable detail the invention is not to be limited to such details as have been set forth except as may be necessitated by the appended claim.

I claim:
1. A light emitting fishing lure comprising
   an electrically conducting body portion having a cavity formed therein for containing a battery in the rear end thereof, the opposite front end thereof being adapted to mate with a head portion in sealing relation with electrical connection to prevent water from entering the cavity portion of said body,
   at least one fish hook secured to said body,
   a spring disposed in the closed rear end of said body cavity and electrically connected to said body and urging said battery toward the opposite front end of said lure body and forming the negative electrical contact for said battery,
   a head portion securable to said body portion and having a reciprocal contact for engaging the positive electrical contact of said battery and having an electrical contact with said body portion,
   at least a pair of LEDs disposed on opposite sides of the lure projecting from the head portion thereof and being electrically connected by positive contacts with said battery, and
   a switch contact actuatable by means of a threaded electrical engagement with said head portion and which projects through said head portion to a contact with the negative leads to said LEDs whereby it can be reciprocated from outside said lure body into and out of contact with the negative leads to said LEDs.

* * * * *